J. H. WIEST.
PIPE CLAMP.
APPLICATION FILED APR. 24, 1908.
918,407.
Patented Apr. 13, 1909.
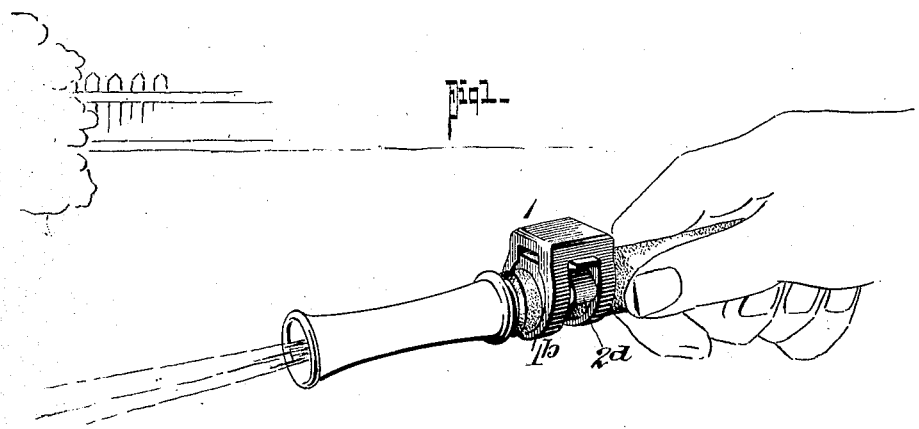
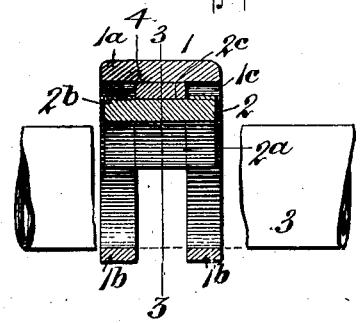
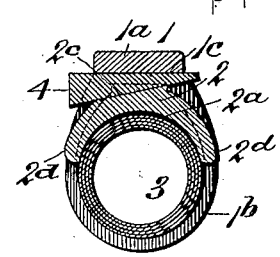
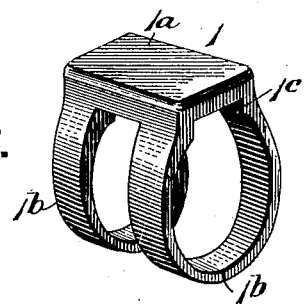
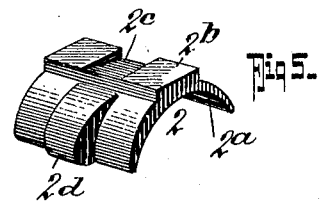
WITNESSES:
John T. Schroth
Charles H. Wagner.
INVENTOR
John H. Wiest
BY
Fred G. Dieterich
ATTORNEYS

UNITED STATES PATENT OFFICE.

JOHN HENRY WIEST, OF BOULDER, COLORADO, ASSIGNOR OF ONE-HALF TO CHARLES A. WOLCOTT AND THOMAS S. WALTEMEYER, OF BOULDER, COLORADO.

PIPE-CLAMP.

No. 918,407.      Specification of Letters Patent.      Patented April 13, 1909.

Application filed April 24, 1908. Serial No. 429,001.

*To all whom it may concern:*

Be it known that I, JOHN HENRY WIEST, residing at Boulder, in the county of Boulder and State of Colorado, have invented certain new and useful Improvements in Pipe-Clamps, of which the following is a specification.

My invention relates to certain new and useful improvements in clamps for rubber hose pipes and the like and in its generic nature, the invention embodies a yoke member having a pair of ring-like sections connected together by a bridge portion and adapted to coöperate with a removable section and a wedge to force the movable section toward the tube and clamp the same.

In its more subordinate nature, the invention embodies certain novel details of construction, combination and arrangement of parts, all of which will be first described in detail, and then be specifically pointed out in the appended claims, reference being had to the accompanying drawings, in which:

Figure 1, is a perspective view showing my invention as applied for use. Fig. 2, is a central, cross section of my invention. Fig. 3, is a section on the line 3—3 of Fig. 2. Fig. 4, is a detail perspective view of the yoke member. Fig. 5, is a similar view of the removable clamping member.

Referring now to the accompanying drawings, in which like letters and numerals of reference indicate like parts in all of the figures, 1 designates the yoke member which comprises the bridge portion $1^a$ and the ring-like yokes $1^b$ which are spaced apart as indicated in Fig. 1, and merge with the bridge portion $1^a$, the inside of the bridge portion being provided with a longitudinal groove $1^c$, as shown and for a purpose which will presently appear.

The removable clamping member 2 comprises a body having a concaved face $2^a$ to engage the tube 3 and on its upper portion the body of the member 2 is provided with a longitudinal lug $2^b$ to fit into the groove $1^c$ of the member 1 the lug $2^b$ being provided with a wedge groove $2^c$ midway its ends and adapted to aline with the space between the ring-like yoke members $1^b$.

$2^d$ designates lugs formed with the body of the member 2, which lugs are adapted to project between the ring-like members $1^b$, as indicated in Fig. 1 and compel longitudinal displacement of the member 2 when in position in the member 1.

In the practical application of my invention, the hose or tube is threaded through the rings $1^b$ and a wedge 4 is inserted between the member 2 and the bridge portion $1^a$ of the member 1, the wedge being driven in the wedge groove $2^c$ of the member 2, thus forcing the member 2 away from the bridge $1^a$ and causing it to coöperate with the ring-like members $1^b$ and tightly clamp the tube.

My invention has numerous uses to which it may be placed, although it is particularly adapted for clamping rubber tubes onto metal nozzles and the like.

From the foregoing description, taken in connection with the accompanying drawings, it is thought the complete construction, operation and advantages of my invention will be readily understood by those skilled in the art to which it appertains.

What I claim is:

1. A clamp comprising a yoke member consisting of a pair of spaced ring-like members and a bridge member connecting said ring-like members together, said bridge member having a longitudinal groove, a removable clamp member held within said yoke member and having a portion projecting into said groove, means interposed between the yoke member and the removable member for forcing the removable member against a tube, said removable member having a wedge groove, and said last named means comprising a wedge insertible in said wedge groove.

2. A clamp comprising a yoke member consisting of a pair of spaced ring-like members and a bridge member connecting said ring-like members together, said bridge member having a longitudinal groove, a removable clamp member held within said yoke member and having a portion projecting into said groove, means interposed between the yoke member and the removable member for forcing the removable member against a tube, said removable member having a wedge groove, and said last named means comprising a wedge insertible in said wedge groove, and said removable member having lugs to enter between the spaced ring members of the yoke member.

JOHN HENRY WIEST.

Witnesses:
CHAS. A. WOLCOTT,
THOMAS S. WALTEMEYER.